(12) United States Patent
Park et al.

(10) Patent No.: US 10,553,211 B2
(45) Date of Patent: Feb. 4, 2020

(54) MOBILE TERMINAL AND METHOD FOR CONTROLLING THE SAME

(71) Applicant: LG ELECTRONICS INC., Seoul (KR)

(72) Inventors: Mihyun Park, Seoul (KR); Hongjo Shim, Seoul (KR); Hyunok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 15/623,753

(22) Filed: Jun. 15, 2017

(65) Prior Publication Data

US 2018/0137862 A1     May 17, 2018

(30) Foreign Application Priority Data

Nov. 16, 2016   (KR) .......................... 10-2016-0152850

(51) Int. Cl.
| | |
|---|---|
| *G10L 15/22* | (2006.01) |
| *G06F 1/3231* | (2019.01) |
| *G06F 1/3234* | (2019.01) |
| *G06K 9/00* | (2006.01) |
| *H04R 3/00* | (2006.01) |

(52) U.S. Cl.
CPC ............ *G10L 15/22* (2013.01); *G06F 1/325* (2013.01); *G06F 1/3231* (2013.01); *G06K 9/00255* (2013.01); *G06K 9/00281* (2013.01); *H04R 3/00* (2013.01)

(58) Field of Classification Search
None
See application file for complete search history.

(56) References Cited

U.S. PATENT DOCUMENTS

| | | | | |
|---|---|---|---|---|
| 5,625,704 | A * | 4/1997 | Prasad ............... | G06K 9/00221 382/115 |
| 6,185,529 | B1 * | 2/2001 | Chen ................... | G10L 15/25 704/231 |
| 6,243,683 | B1 * | 6/2001 | Peters ................. | G10L 15/24 434/4 |
| 6,493,669 | B1 * | 12/2002 | Curry ................ | G10L 15/26 704/257 |
| 9,423,870 | B2 * | 8/2016 | Teller ................ | G06F 3/013 |
| 2002/0035475 | A1 * | 3/2002 | Yoda .................. | G10L 15/24 704/270 |

(Continued)

FOREIGN PATENT DOCUMENTS

| | | |
|---|---|---|
| KR | 10-2013-0094669 A | 8/2013 |
| KR | 10-2014-0034528 A | 3/2014 |

*Primary Examiner* — Jonathan C Kim
(74) *Attorney, Agent, or Firm* — Birch, Stewart, Kolasch & Birch, LLP

(57) ABSTRACT

A mobile terminal including a wireless communication processor configured to provide wireless communication; a microphone; a low-power image sensor configured to detect a subject based on a black and white image sensed by the low-power image sensor; and a controller configured to control the microphone to be in an inactivate state, in response to detecting a face image included in the black and white image sensed by the low-power image sensor, and switch the microphone from the inactive state to an active state and execute a voice recognition function to receive voice information from the subject.

19 Claims, 12 Drawing Sheets

(56) References Cited

U.S. PATENT DOCUMENTS

| | | | |
|---|---|---|---|
| 2002/0052746 A1* | 5/2002 | Handelman | H04N 7/163 704/270 |
| 2002/0135618 A1* | 9/2002 | Maes | G06F 3/0481 715/767 |
| 2003/0018475 A1* | 1/2003 | Basu | G06K 9/00228 704/270 |
| 2003/0144844 A1* | 7/2003 | Colmenarez | G10L 15/24 704/273 |
| 2005/0114132 A1* | 5/2005 | Hsu | G10L 15/22 704/251 |
| 2007/0160240 A1* | 7/2007 | Ito | H04S 7/303 381/300 |
| 2012/0121133 A1* | 5/2012 | Park | G06K 9/00221 382/103 |
| 2013/0021459 A1* | 1/2013 | Vasilieff | G10L 25/78 348/77 |
| 2013/0190055 A1* | 7/2013 | Kulas | G06F 3/041 455/566 |
| 2013/0246071 A1* | 9/2013 | Lee | H04W 52/0254 704/275 |
| 2013/0322634 A1* | 12/2013 | Bennett | G10L 21/00 381/17 |
| 2013/0339019 A1* | 12/2013 | Giancarlo | G10L 15/04 704/251 |
| 2013/0339028 A1* | 12/2013 | Rosner | G10L 15/222 704/275 |
| 2014/0028826 A1* | 1/2014 | Lee | G10L 15/25 348/77 |
| 2014/0122078 A1* | 5/2014 | Joshi | G06F 1/324 704/251 |
| 2014/0122086 A1* | 5/2014 | Kapur | G06F 3/017 704/275 |
| 2014/0163978 A1* | 6/2014 | Basye | G10L 15/28 704/233 |
| 2014/0222436 A1* | 8/2014 | Binder | G06F 3/167 704/275 |
| 2014/0270260 A1* | 9/2014 | Goertz | G10L 25/84 381/110 |
| 2014/0274203 A1* | 9/2014 | Ganong, III | H04W 52/0251 455/556.1 |
| 2014/0303971 A1* | 10/2014 | Yi | H04M 1/605 704/233 |
| 2014/0334645 A1* | 11/2014 | Yun | G10L 15/08 381/110 |
| 2014/0337036 A1* | 11/2014 | Haiut | G10L 15/20 704/275 |
| 2014/0372126 A1* | 12/2014 | Ady | G10L 25/48 704/270.1 |
| 2015/0039303 A1* | 2/2015 | Lesso | G10L 15/28 704/233 |
| 2015/0066495 A1* | 3/2015 | Zhang | G10L 15/02 704/231 |
| 2015/0106013 A1* | 4/2015 | Yokoyama | G10L 15/30 701/522 |
| 2015/0161992 A1* | 6/2015 | Jung | G10L 15/083 704/251 |
| 2015/0206535 A1* | 7/2015 | Iwai | G10L 15/25 704/231 |
| 2015/0242760 A1* | 8/2015 | Miao | H04L 67/42 706/12 |
| 2015/0262005 A1* | 9/2015 | Ohmura | G06F 3/165 348/77 |
| 2016/0064000 A1* | 3/2016 | Mizumoto | G06T 7/73 704/233 |
| 2016/0180837 A1* | 6/2016 | Gustavsson | G06F 1/3203 704/251 |
| 2016/0240194 A1* | 8/2016 | Lee | G06F 1/3206 |
| 2016/0275348 A1* | 9/2016 | Slaby | G06K 9/00604 |
| 2017/0133009 A1* | 5/2017 | Cho | G10L 15/183 |
| 2017/0235361 A1* | 8/2017 | Rigazio | B60K 35/00 715/710 |
| 2017/0243581 A1* | 8/2017 | Mozer | G10L 15/25 |
| 2017/0256270 A1* | 9/2017 | Singaraju | G10L 25/84 |
| 2017/0330555 A1* | 11/2017 | Kawano | G06F 3/16 |
| 2018/0009118 A1* | 1/2018 | Yamaga | B25J 19/026 |
| 2018/0033430 A1* | 2/2018 | Kawano | G10L 15/22 |
| 2018/0082682 A1* | 3/2018 | Erickson | G10L 15/22 |
| 2018/0102125 A1* | 4/2018 | Ko | G10L 15/01 |
| 2018/0130475 A1* | 5/2018 | Page | G06F 21/32 |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0152850, filed on Nov. 16, 2016, the contents of which are incorporated by reference herein in its entirety.

BACKGROUND OF THE INVENTION

1. Field of the Invention

This specification relates to a mobile terminal using a low-power image sensor, and a method for controlling the same.

2. Background of the Invention

Terminals can be divided into mobile/portable terminals and stationary terminals. Also, the mobile terminals can be classified into handheld terminals and vehicle mount terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In recent years, functions for controlling various objects using only voice have been developed using electronic devices capable of recognizing the voice. For example, a speech recognition loudspeaker can control a variety of objects within a home network according to a user's voice. However, a terminal providing such a voice recognition service has to always activate a voice recognition service in order to recognize a voice of a user who speaks at an unspecified time point, thereby consuming a large amount of power.

SUMMARY OF THE INVENTION

Therefore, an aspect of the detailed description is to reduce power consumption in an idle state due to a voice recognition function.

Another aspect of the detailed description is to reduce power consumption due to a voice recognition by detecting a start and end of a voice recognition mode during a voice recognition.

To achieve these and other advantages and in accordance with the purpose of this specification, as embodied and broadly described herein, there is provided a mobile terminal, including a microphone configured to be in an inactive state of restricting a reception of voice information, a low-power image sensor configured to detect a subject based on a black and white image sensor, and a controller configured to switch the microphone from the inactive state to an active state of allowing the reception of the voice information such that a voice recognition function is executed, when a face image is detected through the low-power image sensor.

A method for controlling a mobile terminal according to an embodiment of the present invention can include detecting a face image through a low-power image sensor of detecting a subject based on a black and white image sensor, switching a microphone in an inactive state of restricting a reception of voice information to an active state of allowing the reception of the voice information such that a voice recognition function is executed, when the face image is detected, and executing a specific operation based on the voice information received through the microphone after the execution of the voice recognition function, wherein the executing the specific operation further can include continuously detecting the face image through the low-power image sensor after the execution of the voice recognition function, determining whether or not the face image satisfies a preset condition, and terminating the voice recognition function according to the determination result.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components can be provided with the same or similar reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. can be used herein to describe various elements, these elements should not be limited by these terms. These terms are generally only used to distinguish one element from another. When an element is referred to as being "connected with" another element, the element can be connected with the other element or intervening elements can also be present. In contrast, when an element is referred to as being "directly connected with" another element, there are no intervening elements present.

A singular representation can include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps can likewise be utilized.

Mobile terminals presented herein can be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings can also be applied to stationary terminals such as digital TV, desktop computers, and the like.

Figure 1A:
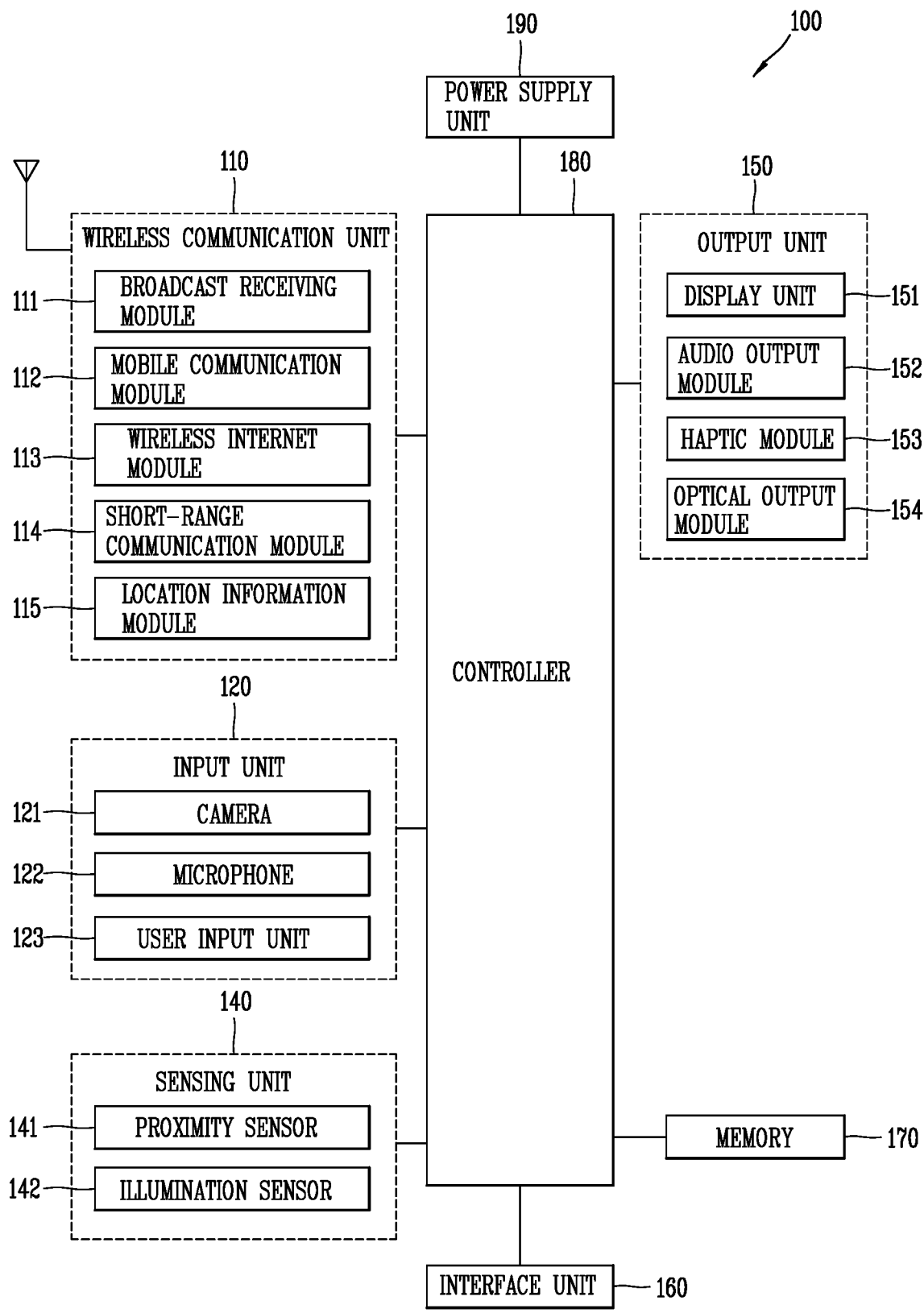
FIG. 1A is a block diagram of a mobile terminal according to an embodiment of the present invention.
Figure 1B:
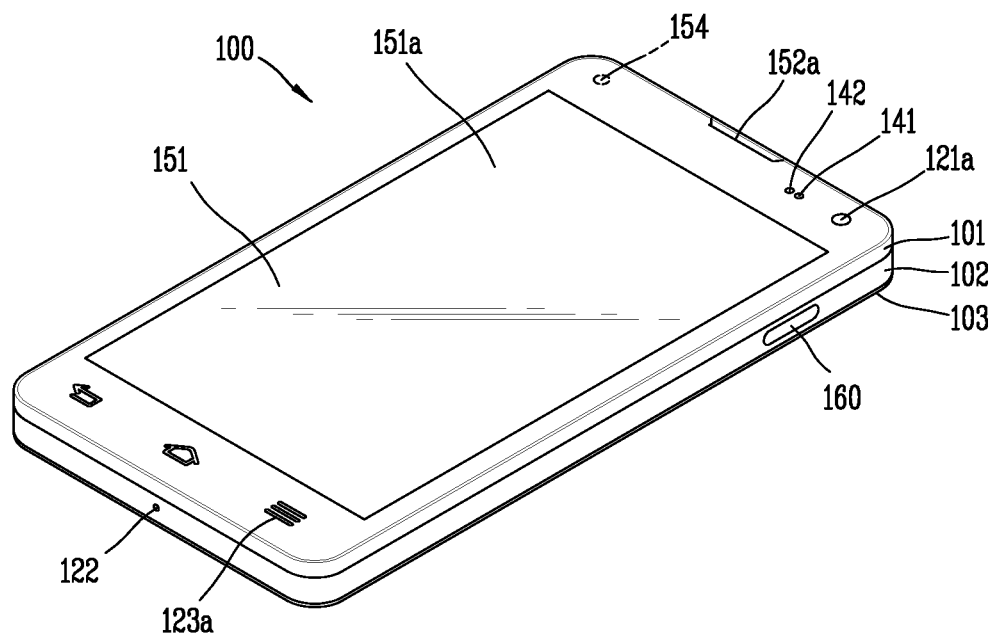
FIGS. 1B and 1C are conceptual views of one example of the mobile terminal, viewed from different directions.
Figure 1C:
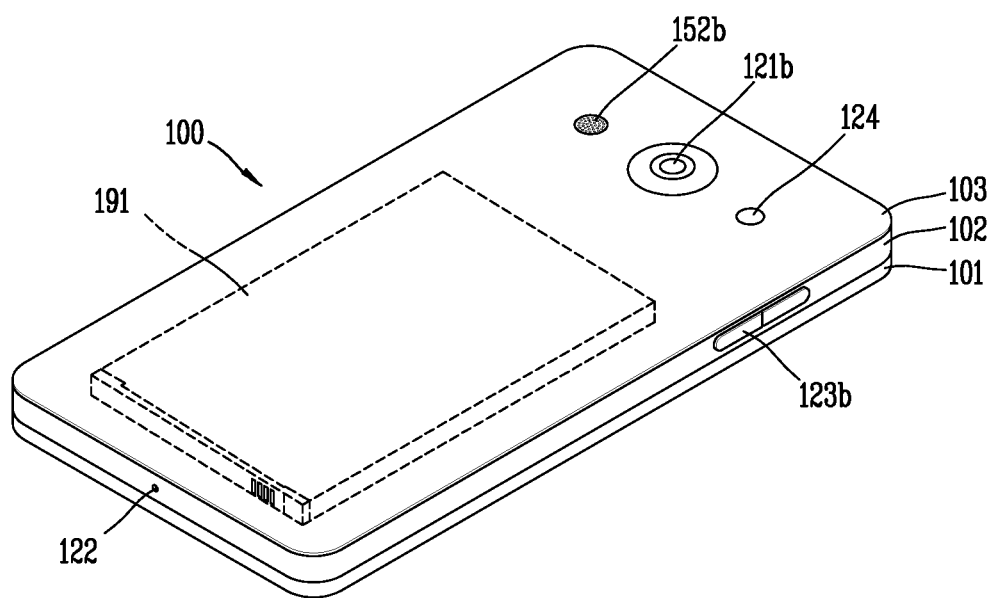

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components can alternatively be implemented.

In more detail, the wireless communication unit 110 can typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 can typically include one or more modules which connect the mobile terminal 100 to one or more networks.

The wireless communication unit 110 can include one or more of a broadcast receiving module 111, a mobile communication module 112, a wireless Internet module 113, a short-range communication module 114, and a location information module 115. The input unit 120 can include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) can be obtained by the input unit 120 and can be analyzed and processed according to user commands.

The sensing unit 140 can typically be implemented using one or more sensors configured to sense internal information of the mobile terminal, the surrounding environment of the mobile terminal, user information, and the like. For example, the sensing unit 140 can include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein can be configured to utilize information obtained from one or more sensors of the sensing unit 140, and combinations thereof.

The output unit 150 can typically be configured to output various types of information, such as audio, video, tactile output, and the like. The output unit 150 can be shown having at least one of a display unit 151, an audio output module 152, a haptic module 153, and an optical output module 154. The display unit 151 can have an inter-layered structure or an integrated structure with a touch sensor in order to facilitate a touch screen. The touch screen can provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, can include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 can be configured to store application programs executed in the mobile terminal 100, data or instructions for operations of the mobile terminal 100, and the like. Some of these application programs can be downloaded from an external server via wireless communication. Other application programs can be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 can include a battery, and the battery can be configured to be embedded in the terminal body, or configured to be detachable from the terminal body.

At least part of the components can cooperatively operate to implement an operation, a control or a control method of a mobile terminal according to various embodiments disclosed herein. Also, the operation, the control or the control method of the mobile terminal can be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel can include a satellite channel, a terrestrial channel, or both. In some embodiments, two or more broadcast receiving modules 111 can be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module can be internally or externally coupled to the mobile terminal 100. The wireless Internet module 113 can transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 can transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which can be configured similarly to mobile terminal 100) can be a wearable device, for example, a smart watch, a smart glass or a head mounted display (HMD), which can exchange data with the mobile terminal 100 (or otherwise cooperate with the mobile terminal 100). The short-range communication module 114 can sense or recognize the wearable device, and permit communication between the wearable device and the mobile terminal 100. In addition, when the sensed wearable device is a device which is authenticated to communicate with the mobile terminal 100, the controller 180, for example, can cause transmission of at least part of data processed in the mobile terminal 100 to the wearable device via the short-range communication module 114. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 can alternatively or additionally function with any of the other modules of the wireless communication unit 110 to obtain data related to the position of the mobile terminal. The location information module 115 is a module used for acquiring the position (or the current position) and can not be limited to a module for directly calculating or acquiring the position of the mobile terminal.

The input unit 120 can be configured to permit various types of inputs to the mobile terminal 120. Examples of such inputs include audio, image, video, data, and user input. Image and video input is often obtained using one or more cameras 121. Such cameras 121 can process image frames of still pictures or video obtained by image sensors in a video or image capture mode. The processed image frames can be displayed on the display unit 151 or stored in memory 170. Meanwhile, the cameras 121 can be arranged in a matrix configuration to permit a plurality of images having various angles or focal points to be input to the mobile terminal 100. Also, the cameras 121 can be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 can include assorted noise removing algorithms to remove unwanted noise generated in the course of receiving the external audio signal.

The user input unit 123 is a component that permits input by a user. Such user input can enable the controller 180 to control operation of the mobile terminal 100. The user input unit 123 can include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element can be a virtual key, a soft key or a visual key, which is displayed on a touch screen through software processing, or a touch key which is located on the mobile terminal at a location that is other than the touch screen. Further, the virtual key or the visual key can be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 can be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 can be arranged at an inner region of the mobile terminal covered by the touch screen, or near the touch screen.

The proximity sensor 141, for example, can include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) can also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 can sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor can be configured to convert changes of pressure applied to a specific part of the display unit 151, or convert capacitance occurring at a specific part of the display unit 151, into electric input signals. The touch sensor can also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals can be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input can be decided based on a current operating state of the mobile terminal 100 or a currently executed application program, for example.

The touch sensor and the proximity sensor can be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor can be implemented to recognize location information relating to a touch object using ultrasonic waves. The controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source can be calculated using this fact. For instance, the position of the wave generation source can be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor can allow detection of a touch of a physical object with respect to a 3D stereoscopic image. The photo sensor can be laminated on, or overlapped with, the display device. The photo sensor can be configured to scan movement of the physical object in proximity to the touch screen. In more detail, the photo sensor can include photo diodes and transistors at rows and columns to scan content received at the photo sensor using an electrical signal which changes according to the quantity of applied light. Namely, the photo sensor can calculate the coordinates of the physical object according to variation of light to thus obtain location information of the physical object.

The display unit 151 is generally configured to output information processed in the mobile terminal 100. For example, the display unit 151 can display execution screen information of an application program executing at the mobile terminal 100 or user interface (UI) and graphic user interface (GUI) information in response to the execution screen information.

Also, the display unit 151 can be implemented as a stereoscopic display unit for displaying stereoscopic images. A typical stereoscopic display unit can employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data can be obtained from any of a number of different sources, such that the audio data can be received from the wireless communication unit 110 or can have been stored in the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 can also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 can output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 can be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule notice, an email reception, information reception through an application, and the like.

A signal output by the optical output module 154 can be implemented so the mobile terminal emits monochromatic light or light with a plurality of colors. The signal output can be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 can include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating authority of using the mobile terminal 100 and can include a user identity module (UIM), a subscriber identity module (SIM), a universal subscriber identity module (USIM), and the like. In addition, the device having the identification module (also referred to herein as an "identifying device") can take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or can serve as a passage to allow various command signals input by the user from the cradle to be transferred to the mobile terminal there through. Various command signals or power input from the cradle can operate as signals for recognizing that the mobile terminal is properly mounted on the cradle.

The memory 170 can store programs to support operations of the controller 180 and store input/output data (for example, phonebook, messages, still images, videos, etc.). The memory 170 can store data related to various patterns of vibrations and audio which are output in response to touch inputs on the touch screen.

The memory 170 can include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 can include a battery, which is typically rechargeable or be detachably coupled to the terminal body for charging.

The power supply unit 190 can include a connection port. The connection port can be configured as one example of the interface unit 160 to which an external charger for supplying power to recharge the battery is electrically connected. As another example, the power supply unit 190 can be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein can be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152a/152b, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject. As shown in FIG. 1C, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that can be implemented in a mobile terminal configured as above will be described with reference to the accompanying drawings. It will be apparent to those skilled in the art that the present invention can be embodied in other specific forms without departing from the spirit or essential characteristics thereof.

The mobile terminal according to an embodiment of the present invention can further include a low-power image sensor for sensing an object using low power. Hereinafter, a low-power image sensor will be described with reference to FIG. 2, which is a block diagram illustrating components of the low-power image sensor.

The mobile terminal according to an embodiment of the present invention can include a low-power image sensor 200. The low-power image sensor 200 is a low-power CMOS sensor, and is a sensor for detecting an object located within a predetermined area based on a black and white image sensor. Such a sensor can also be referred to as a glance sensor.

Figure 2:
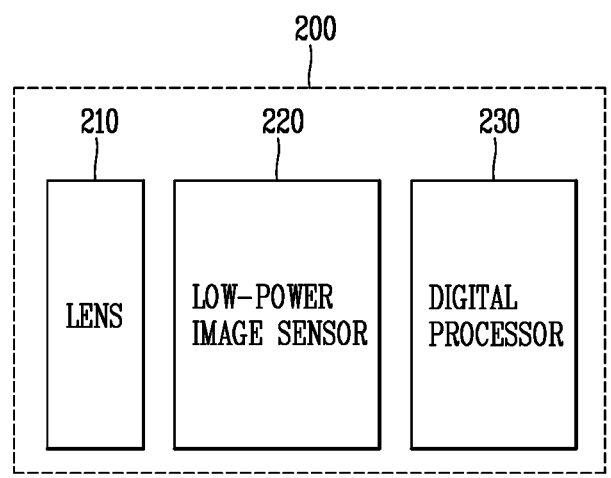
FIG. 2 is a block diagram illustrating a low-power image sensor provided in a mobile terminal according to an embodiment of the present invention.

Referring to FIG. 2, the low-power image sensor (i.e., glance sensor) 200 includes a lens 210, a low-power image sensor 220 and a digital processor 230. A range of a field of view (FOV) of the lens 210 can be wider than a range of a FOV of a front camera lens. For example, the range of the FOV of the lens 210 can be 120 degrees, and the range of the FOV of the front camera can be 82 degrees. Thus, the low-power image sensor can sense an image of an object that is located in a wider range than the front camera.

The image sensor 220 can sense a black and white image of a subject to be photographed. For example, the image sensor 220 can sense black and white QVGA (resolution 320×240) images. Therefore, the image sensor 220 consumes less power than the front camera using a color sensor.

The digital processor 230 can execute face detection, eye detection, gesture detection, and the like based on the black and white image sensed by the image sensor 220. In particular, the face detection is a process for detecting whether or not a subject captured in a black and white image is a face image, and the eye detection is a process for detecting whether or not a subject captured in a black and white image is an eye image. In addition, the gesture detection is a process for detecting a gesture of a subject captured in a black and white image.

For example, the digital processor 230 can analyze the black and white image received from the image sensor 220 based on a predetermined algorithm, and determine based on the analysis result whether the subject captured in the black and white image is a user's face or the user's finger. In addition, the digital processor 230 can perform an overall control of an operation of the low-power image sensor 200 through communication with a main processor (i.e., the controller 180, see FIG. 1) of the mobile terminal.

Specifically, the digital processor 230 can receive a control command or a control signal from the main processor and control the operation of the low-power image sensor 200 using the lens 210 and the image sensor 220 based on the received control command or control signal. The digital processor 230 can transmit the result of the operation of the low-power image sensor 200 to the main processor. For example, the digital processor 230 can transmit result information from face detection, eye detection, gesture detection, and the like to the main processor.

Further, since the digital processor 230 receives a low-resolution black and white image from the image sensor 220, the face recognition based on the low-resolution black and white image fails to be executed. The low-power image sensor can detect adjacent objects by using lower power than a proximity sensor which detects the proximity of an adjacent object using existing light or a magnetic field. Therefore, it can be utilized as a substitute for the existing proximity sensor.

In addition, the digital processor 230 may further include a memory for storing a low-power CPU, algorithm information, and the like, and hardware blocks. Hereinafter, a method of executing a voice recognition in a mobile terminal having a low-power image sensor will be described.

Figure 3:
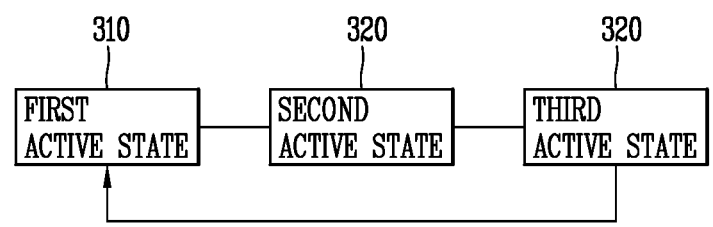
FIG. 3 is a block diagram illustrating a state of a microphone involved in an execution of a voice recognition function according to the related art.
Figure 4:
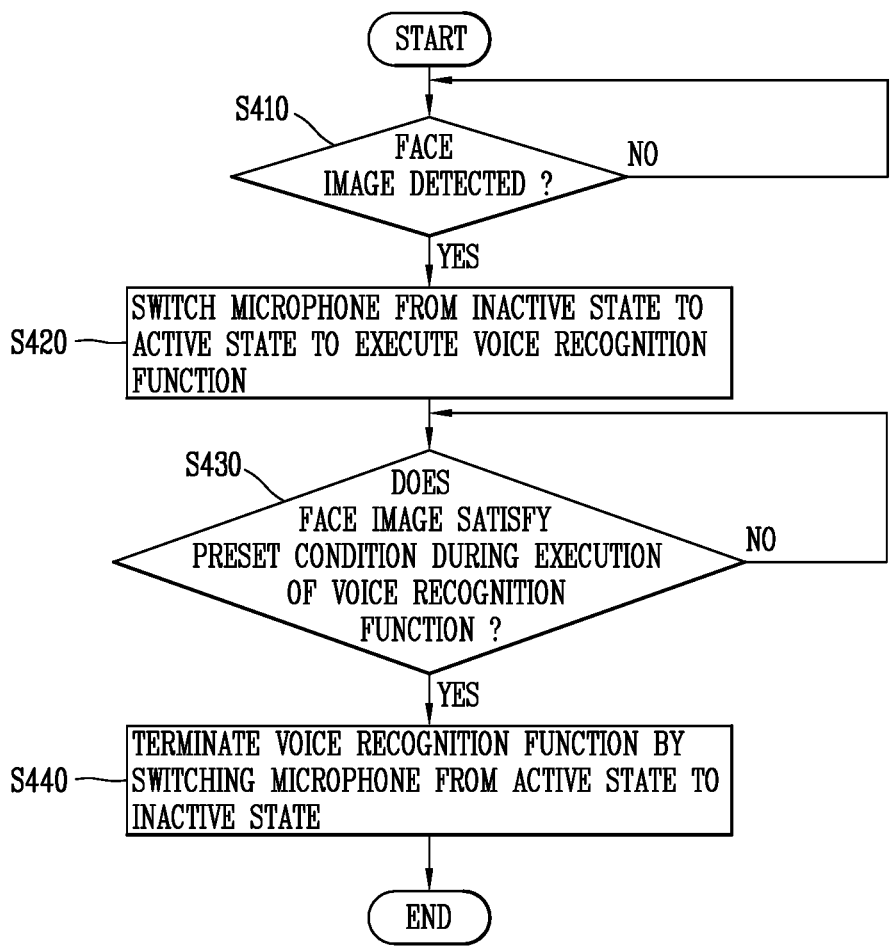
FIG. 4 is a flowchart illustrating a method of executing a voice recognition function in a mobile terminal according to an embodiment of the present invention.
Figure 5:
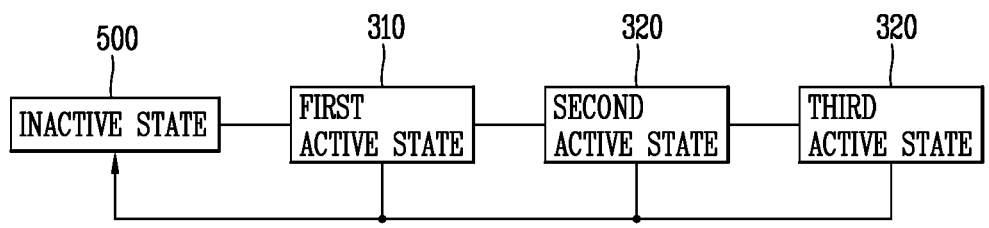
FIG. 5 is a block diagram illustrating a state of a microphone involved in an execution of a voice recognition function according to an embodiment of the present invention.
Figure 6:
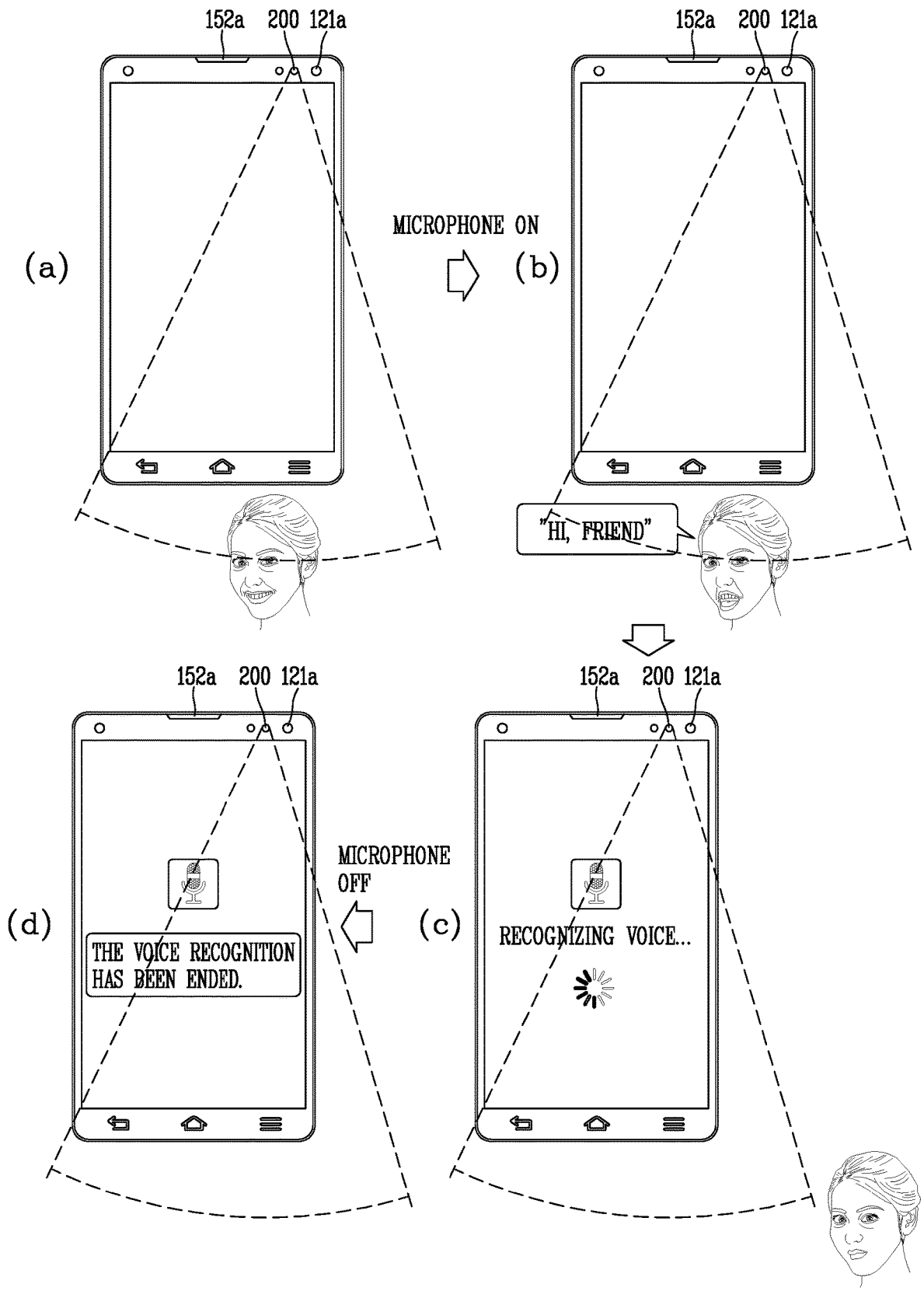
FIG. 6 is a conceptual view illustrating the control method of FIG. 4.

Embodiments of the present invention provide a method of reducing power consumption caused during an execution of the voice recognition function, by way of utilizing the low-power image sensor 200 in the mobile terminal. First, FIG. 3 is a block diagram illustrating a state of a microphone involved in an execution of a voice recognition function according to the related art. In addition, FIG. 4 is a flowchart illustrating a method of executing a voice recognition function in a mobile terminal according to an embodiment of the present invention, and FIG. 5 is a block diagram illustrating a state of a microphone involved in an execution of a voice recognition function according to an embodiment of the present invention. Also, FIG. 6 is a conceptual view illustrating the control method of FIG. 4.

The mobile terminal according to an embodiment of the present invention can analyze voice information received through a microphone based on a predetermined algorithm and execute a specific operation based on the analysis result. A function of analyzing the voice information and executing the specific operation can be called a voice recognition function.

The voice recognition function can provide a convenient way to drive the mobile terminal by transmitting a control command to the mobile terminal through a voice at a remote place even if a user does not directly input a touch or push input to the mobile terminal. The voice recognition function can also be executed by an application installed when producing the mobile terminal at a factory, or can be executed by a third party application installed by the user.

Further, since the related art mobile terminal cannot predict a start time point of speech of the user when the voice recognition function is executed, the microphone is always set in an active state to recognize the voice uttered by the user at any time. An activation of the microphone refers to a state that a current is supplied to the microphone and voice information can be received through the microphone. Conversely, a deactivation of the microphone refers to a state that the current supply to the microphone is cut off and a reception of voice information via the microphone is impossible. This activation of the microphone can be specified in three states depending on an amount of current supplied to the microphone.

Referring to FIG. 3, the active state of the microphone can be divided into a first active state, a second active state, and a third active state. The controller 180 can appropriately control the active state of the microphone according to a situation. First, the first active state 310 is a state in which the controller 180 continuously monitors whether or not a sound over a specific loudness is detected through the microphone. That is, the first active state 310 is a step of determining whether or not the user is currently speaking in order to start the voice recognition.

In this first active state 310, only the presence or absence of the sound above the specific loudness is determined, and no voice analysis based on received voice information is executed. Since the speech analysis is not executed in the first active state 310, low electric power, for example, a current of about 4.4 mA is consumed. This first active state 310 can also be referred to as a "listening phase."

Next, the second active state 320 can be executed when a sound of a specific loudness or more is sensed in the first active state 310. The second active state 320 is a state in which the controller 180 determines whether a specific word is included in voice information uttered by the user. For example, in the second active state 320, the controller 180 can determine whether or not a word (phrase) "Hello, my phone" is included in a sound of a specific loudness or more.

The specific word is a word stored in advance in the memory, and is a word corresponding to a user's control command for starting analysis of voice information. For example, the specific word can be "Hello, my phone" or "Hi, Friend." This specific word can be preset on a voice recognition application installed in the mobile terminal, or can be set by the user. Since the specific word is detected in the second active state 320, the current consumption in the second active state 320 can increase more than that in the first active state. This second active state 320 can be referred to as a "keyword detection phase."

Next, the third active state 330 can be executed when the specific word is detected in the second active state 320. The third active state 330 is a state in which the controller 180 analyzes voice information received through the microphone based on a preset algorithm. The controller 180 can control the mobile terminal according to a voice command corresponding to the voice information based on the analysis result. Alternatively, the voice analysis can be executed using a separate third party application installed in the mobile terminal. The third active state 330 causes higher current consumption than the first active state 310 and the second active state 320 due to the execution of the voice analysis. Meanwhile, the third active state 330 can also be referred to as a "voice command phase."

When the microphone is in the third active state 330, the controller 180 can analyze voice information uttered by the user and control the operation of the mobile terminal according to the analysis result. For example, when the controller 180 receives voice information "What is the current weather?", the controller 180 can output information related to the current weather to provide weather information to the user. Hereinafter, unless otherwise specified, the first, second, and third active states are collectively referred to as an "active state."

Since the related art voice recognition function cannot predict when the user will speak, the microphone has to be always activated by using the minimum power. That is, in the related art voice recognition function, the microphone is always kept in the first active state. Accordingly, there are problems in that power required to activate the microphone is used, and an overall standby power consumption of the mobile terminal is high.

In addition, the related art voice recognition function cannot recognize when the user stops the speech, and accordingly cannot be automatically terminated during the execution thereof unless the user's control command is separately applied.

In order to solve these problems, the present invention proposes a method in which the mobile terminal controls an execution of a voice recognition function using a low-power image sensor. Referring to FIG. 4, the controller 180 can detect a face image of a user (S410).

First, the mobile terminal according to an embodiment of the present invention can always keep the low-power image sensor 200 active and the microphone inactive. This low-power image sensor 200 consumes a current of 0.3 mA, namely, less power than the current of 4.4 mA, which is consumed by the microphone to maintain the first active state. Therefore, the current consumed for activating the microphone can be reduced, thereby reducing the total standby power.

The controller 180 can determine whether the user's face is present within a preset range through the low-power image sensor 200. The preset range can be a range of detecting an object by the low-power image sensor 200, namely, a range of a FOV of the lens 210.

The low-power image sensor 200 can detect a face image on a black and white image captured within the FOV range. The low-power image sensor 200 can capture the black and white image in real time or at a preset interval, and detect whether or not the face image is included in the captured black and white image. Alternatively, the low-power image sensor 200 can transmit the black and white image to the controller 180, and the controller 180 can detect the face image based on the black and white image. When the face image is detected, the controller 180 can switch the microphone from the inactive state to the active state (S420).

Referring to FIG. 5, the microphone according to an embodiment of the present invention can have an inactive state and an active state. The inactive state 500 is a state of the microphone that does not receive voice information that the user has uttered. In this inactive state 500, no power can be consumed by the microphone. That is, if there is no separate control command, the mobile terminal according to an embodiment of the present invention can set the microphone to the inactive state. In this instance, the voice recognition function can not be executed.

When the face image is detected through the low-power image sensor 200, the controller 180 can switch the microphone from the inactive state to the active state and execute the voice recognition function. More specifically, the controller 180 can predict a start time point of speech utterance of the user based on a mouth shape included in the face image. For example, the controller 180 can predict (or determine) that the user will utter a voice when the mouth shape is determined to have a predetermined distance between an upper lip and a lower lip for the voice utterance. That is, the controller 180 can predict (or determine) the start time point of the voice utterance of the user through the detected face image.

The controller 180 can activate the microphone to receive the voice uttered by the user from the start time point of the voice utterance when the start time point of the user's voice utterance is predicted. In this instance, the microphone can be activated in the first active state 310 (see FIG. 3). Afterwards, as in the description of FIG. 3, the microphone can have the first to third active states according to preset conditions. In addition, the controller 180 can detect a sound of a specific loudness or more, determine whether a specific word is included, or analyze voice information according to the active state of the microphone. A detailed description related to this will be replaced by the description of FIG. 3.

Meanwhile, the low-power image sensor 200 according to an embodiment of the present invention can continuously detect the face image during the execution of the voice recognition function (S430). The low-power image sensor 200 can continue to detect the face image even when the voice recognition function is executed. That is, the low-power image sensor 200 can detect whether the user's face exists in a surrounding area of the mobile terminal during the execution of the voice recognition function to determine an end time point of the voice recognition function.

More specifically, the low-power image sensor 200 can predict the end time point of the user's voice utterance when the face image satisfies a preset condition. The preset condition can be a condition related to a mouth motion included in the face image or a condition that a distance between the user and the mobile terminal is a predetermined distance or more. When the face image satisfies the preset condition, the controller 180 can switch the microphone from the active state to the inactive state to terminate the voice recognition function (S440).

When the face image satisfies the preset condition, the controller 180 can predict a time point that the face image has been determined to satisfy the preset condition as the end time point of the user's voice utterance. Accordingly, the controller 180 can terminate the voice recognition function to reduce an unnecessary power consumption due to the execution of the voice recognition function.

In addition, the controller 180 can control the active state of the microphone to reduce power consumed by the microphone, at the same time of terminating the voice recognition function. For example, the controller 180 can control the microphone from the active state to the inactive state. Therefore, the controller 180 can naturally terminate the voice recognition function even if there is no separate control command from the user.

Hereinafter, the aforementioned method of executing the voice recognition function will be described along with an embodiment. Referring to (a) of FIG. 6, the low-power image sensor 200 can be disposed on a front surface of the main body of the mobile terminal. For example, the low-power image sensor 200 can be located between the microphone 152a of the mobile terminal and the front camera 121a. Accordingly, the low-power image sensor 200 can sense a face image of a user located in a predetermined area on the front surface of the mobile terminal.

When the user's face image is detected, the controller 180 can switch the microphone from the inactive state to the active state, thereby executing the voice recognition function. In this instance, the microphone can be switched to the first active state to determine whether or not a sound of a specific loudness or more is detected. Thereafter, the controller 180 can switch the microphone to the second active state when the sound of the specific loudness or more is detected in the microphone.

As illustrated in (b) of FIG. 6, when the controller 180 detects a specific word "Hi, friend" in the second active state of the microphone, the controller 180 can switch the microphone to the third active state. As illustrated in (c) of FIG. 6, the low-power image sensor 200 can not detect a face image while the microphone is in the third active state.

That is, the user's face can be out of a range that the low power mage sensor 200 can sense the face. In this instance, the controller 180 can predict the end time point of the user's voice utterance. Thus, as illustrated in (d) of FIG. 6, the controller 180 can switch the microphone from the third active state to the inactive state, and terminate the voice recognition function. That is, the controller 180 can set the end time point of the user's voice utterance as the end time point of the voice recognition function, and terminate the voice recognition function.

Accordingly, by predicting the start and end time points of the voice recognition function, the present invention can reduce the current consumption due to the continuous activation of the voice recognition function. The foregoing description has been given of the method of predicting the start and end time points of the voice recognition function and reducing the current consumption due to the voice recognition function.

Figure 7:
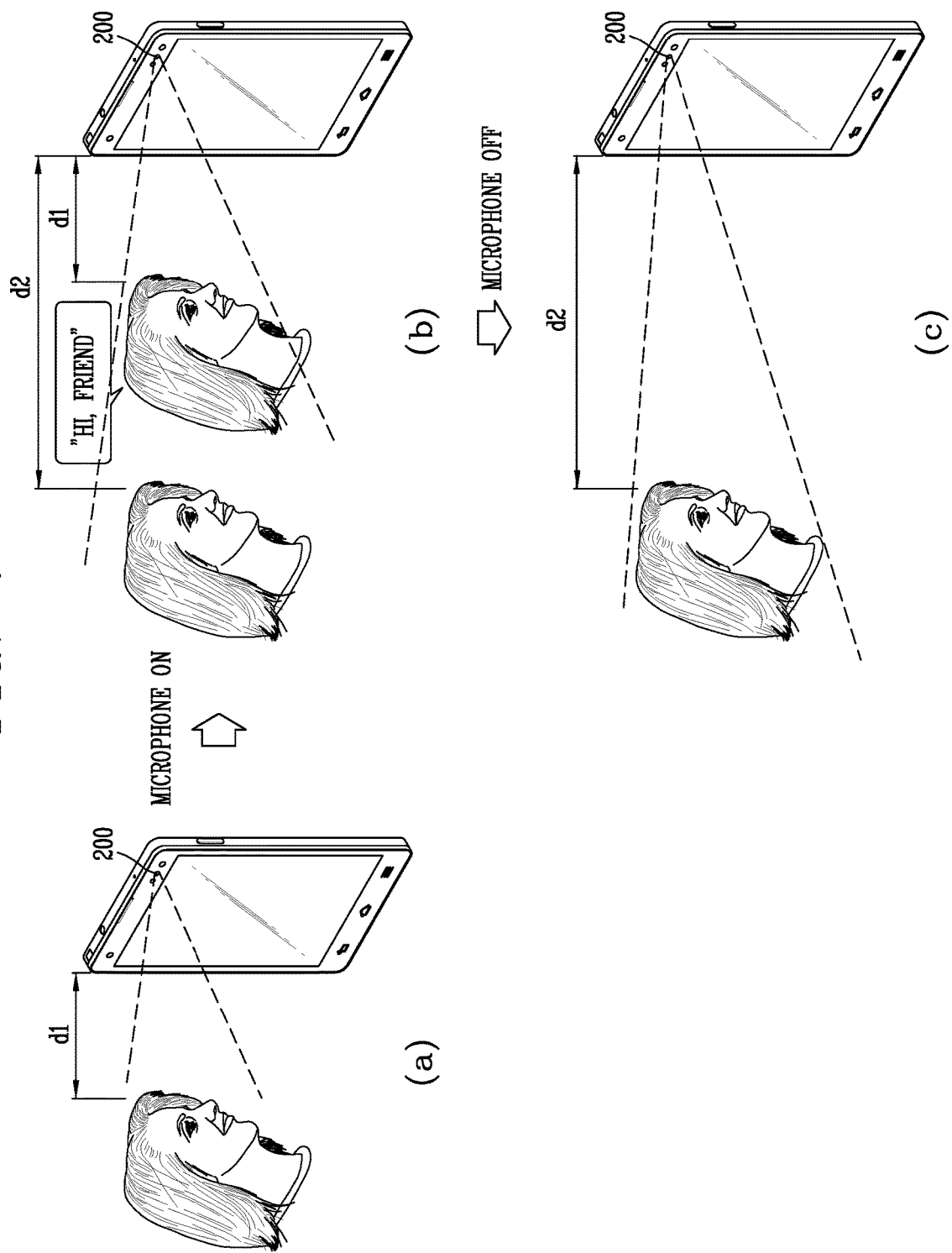
FIG. 7 is a conceptual view illustrating one embodiment of a method of ending (terminating) a voice recognition function according to an embodiment of the present invention.
Figure 8:
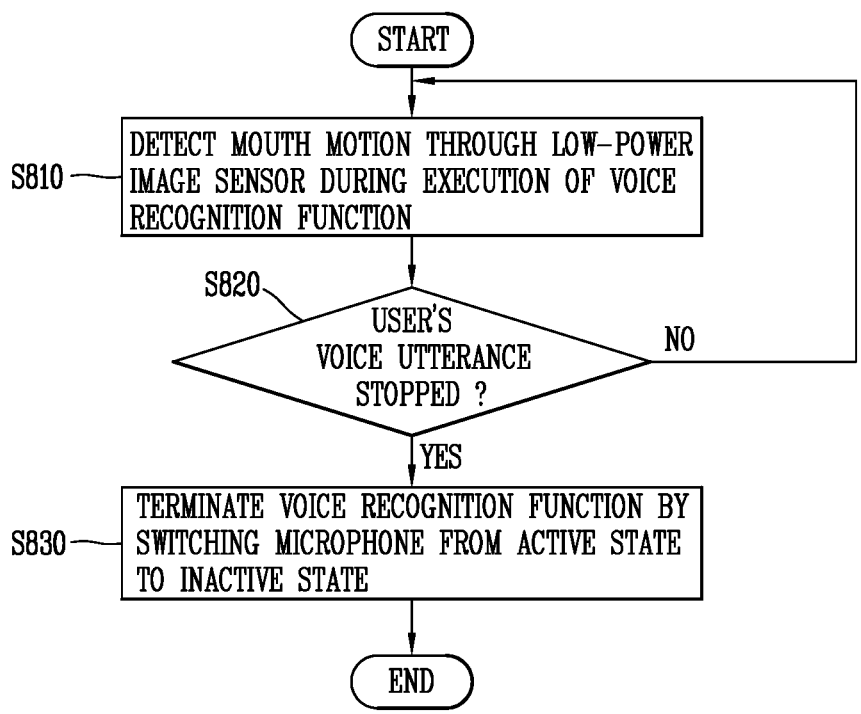
FIG. 8 is a flowchart illustrating another embodiment of a method of ending a voice recognition function according to an embodiment of the present invention.
Figure 9:
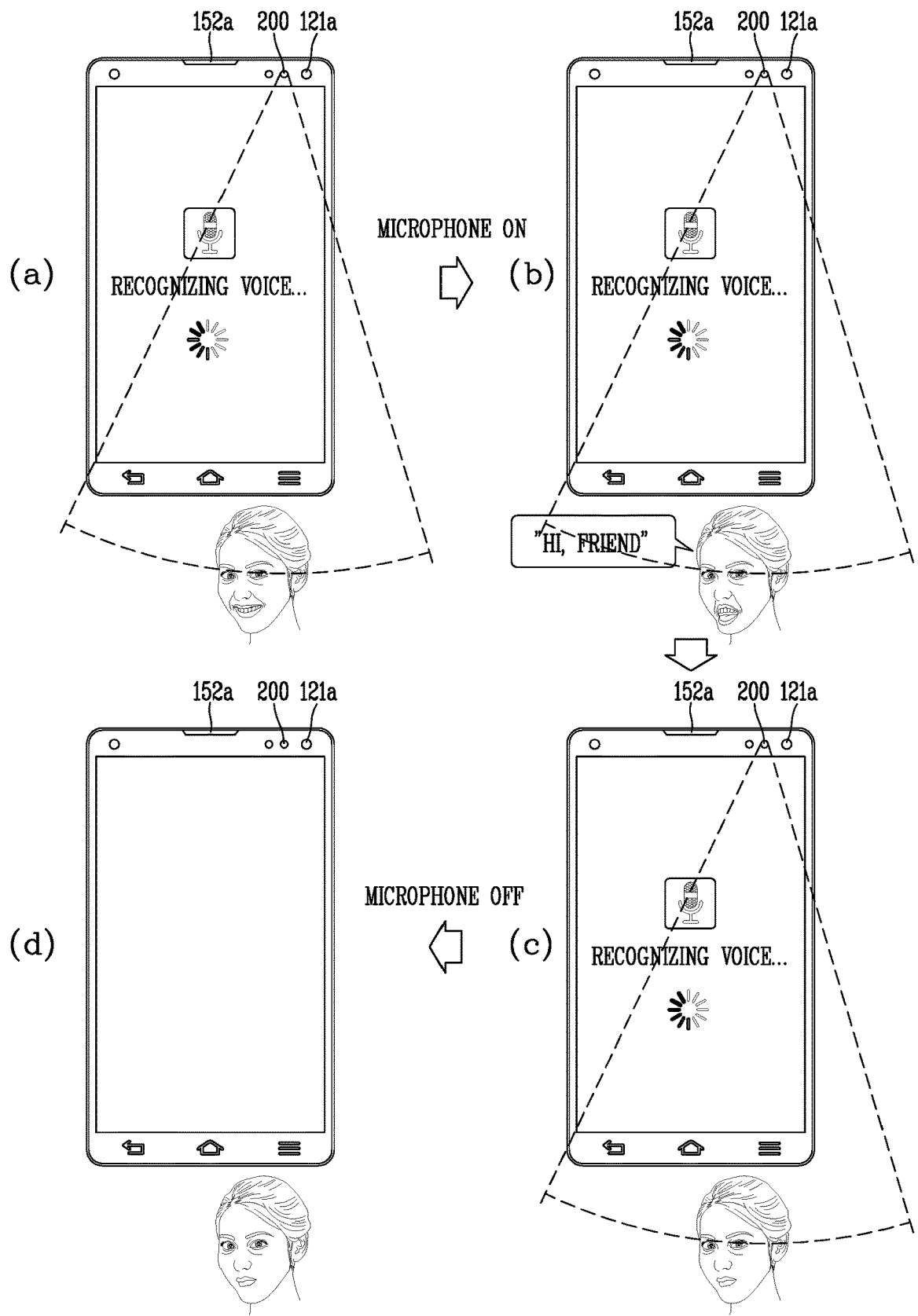
FIGS. 9 to 10B are conceptual views illustrating the control method of FIG. 8.

Hereinafter, a method for determining an end time point of a voice recognition function in a mobile terminal according to an embodiment of the present invention will be described. FIG. 7 is a conceptual view illustrating embodiments related to the end time point of the voice recognition function, FIG. 8 is a flowchart illustrating another embodiment related to the end time point of the voice recognition function, and FIGS. 9 to 10B are conceptual views illustrating the control method of FIG. 8.

The controller 180 of the mobile terminal according to an embodiment of the present invention can predict the end time point of the voice recognition function of the user based on a face image sensed through the low-power image sensor 200 during an execution of the voice recognition function. More specifically, the controller 180 can extract a mouth shape from the face image sensed through the low-power image sensor 200 during the execution of the voice recognition function. Then, the controller 180 can determine the end time point of the voice recognition function of the user based on the extracted mouth shape satisfying the preset condition.

When the user is away from the microphone of the mobile terminal by a predetermined distance or more, a voice recognition rate of the voice recognition function can significantly decrease. Accordingly, the controller 180 can terminate the voice recognition function when it is determined that the user is away from the microphone of the mobile terminal by the predetermined distance or more.

The distance between the user and the mobile terminal can be determined based on the size of the mouth shape. For example, referring to (a) and (b) of FIG. 7, the user can be away from the front surface of the mobile terminal by a distance d1 or d2. In this instance, when the distance between the user and the mobile terminal is d2 or more, the controller 180 can terminate the voice recognition function because the voice recognition rate is drastically lowered.

As an example of determining the distance between the user and the mobile terminal, the controller 180 can extract a mouth shape from a face image received from the low-power image sensor 200 and detect a size of the extracted mouth shape. The controller 180 can determine that the user and the microphone are separated by the predetermined distance d2 or more when the size of the mouth shape is less than a preset size. In this instance, as illustrated in (c) of FIG. 7, the controller 180 can set a time point that the mouth shape has been determined to be less than the preset size as the end time point of the voice recognition function, and terminate the voice recognition function.

As another example, when the face image is not detected from the low-power image sensor 200, the controller 180 can determine that the user and the microphone are separated by the predetermined distance d2 or more. That is, since the low-power image sensor 200 can detect a subject located within a predetermined distance (for example, 2 m to 3 m). Hence, the low-power image sensor 200 can determine that the user is located in a position where the voice recognition is not allowed when the distance between the user and the microphone is longer than a predetermined distance. Similarly, the controller 180 can terminate the voice recognition function.

As another example, the controller 180 can terminate the voice recognition function even when the user is located in a range beyond the FOV of the low-power image sensor 200. That is, when the user's face image is not detected through the low-power image sensor 200 because the user is located in the range beyond the FOV of the low-power image sensor 200, the controller 180 can determine that the user does not use the mobile terminal and terminate the voice recognition function. Alternatively, the controller 180 can determine the mouth motion based on the mouth shape extracted from the face image, and terminate the voice recognition function according to the mouth motion.

Referring to FIG. 8, the controller 180 can detect a mouth motion through the low-power image sensor during an execution of the voice recognition function (S810). The controller 180 can determine the mouth motion based on the mouth shape extracted from the face image during the execution of the voice recognition function. For example, the controller 180 can compare mouth shapes extracted from at least two face images, and determine presence of the mouth motion when the extracted mouth shapes are different from each other by a preset ratio or more. Further, when the extracted mouth shapes are different from each other by lower than the preset ratio, the controller 180 can determine absence of the mouth motion.

The controller 180 can determine whether the user's voice utterance is terminated based on the mouth motion (S820). That is, when the controller 180 determines the presence of the mouth motion, the controller 180 can determine that the user's voice utterance has not been terminated. Further, when the controller 180 determines the absence of the mouth motion, the controller 180 can determine that the user's voice utterance has been terminated.

For example, as illustrated in (a) and (b) of FIG. 9, when at least two face images having different mouth shapes are detected, the controller 180 can determine that the mouth motion is present. In this instance, the controller 180 can determine that the user's voice utterance has not been terminated. Accordingly, the controller 180 can continuously execute the voice recognition function.

Further, as illustrated in (c) and (d) of FIG. 9, when at least two face images having the same mouth shape are detected, the controller 180 can determine that there is no mouth motion. In this instance, the controller 180 can determine that the user's voice utterance has been terminated. Accordingly, the controller 180 can terminate the voice recognition function and switch the microphone from the active state to the inactive state (S830).

As described above, according to an embodiment of the present invention, the end time point to terminate the voice recognition function can be predicted even without any separate control command, and accordingly the voice recognition function can be terminated. As a result, the present invention can prevent unnecessary current consumption due to the execution of the voice recognition function.

The foregoing description has been given of the method of switching the microphone to the inactive state when the mouth motion is not detected, but the controller 180 can alternatively control the activation state instead of deactivating the microphone. More specifically, the controller 180 can switch the microphone from the third active state to the first active state when it is determined that the user's voice utterance has been terminated in the third active state of the microphone. That is, even though it is determined that there is no mouth motion, the present invention can not immediately terminate the voice recognition function.

Figure 10A:
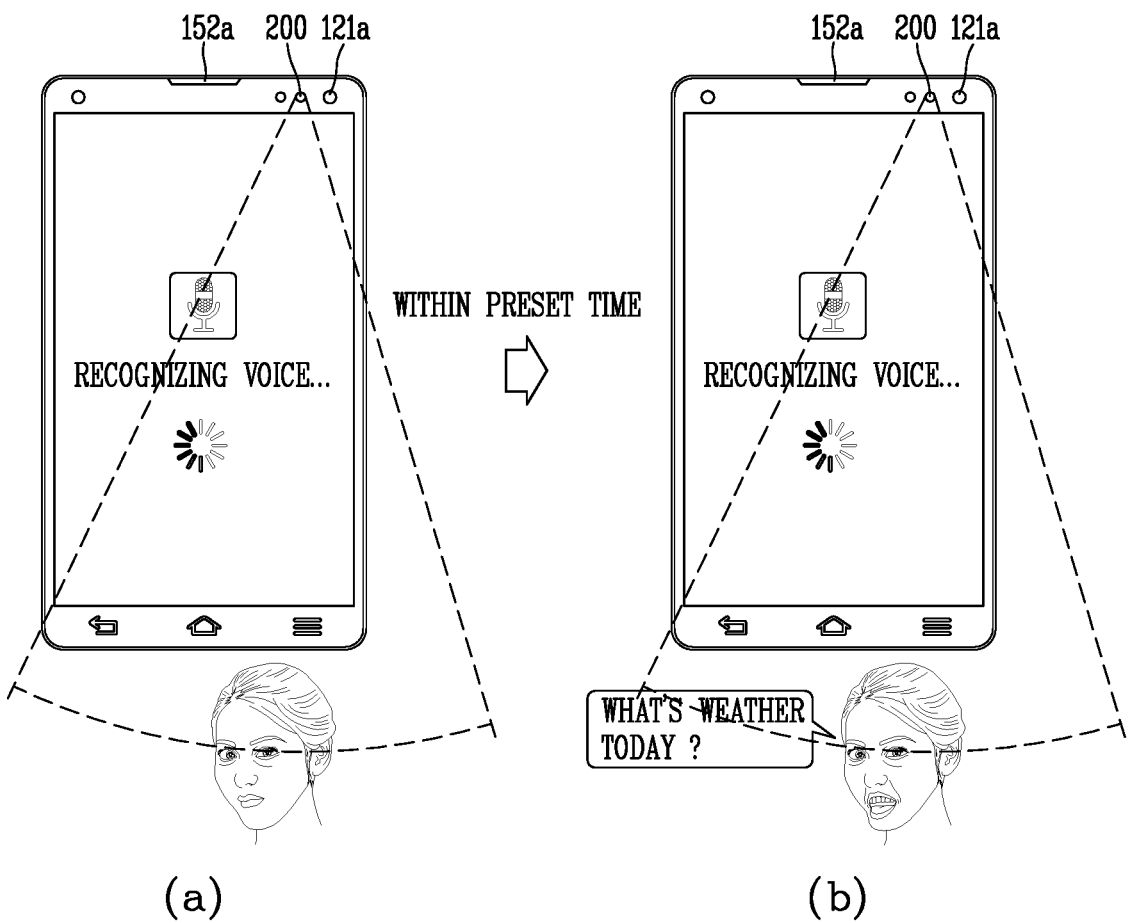
Figure 10B:
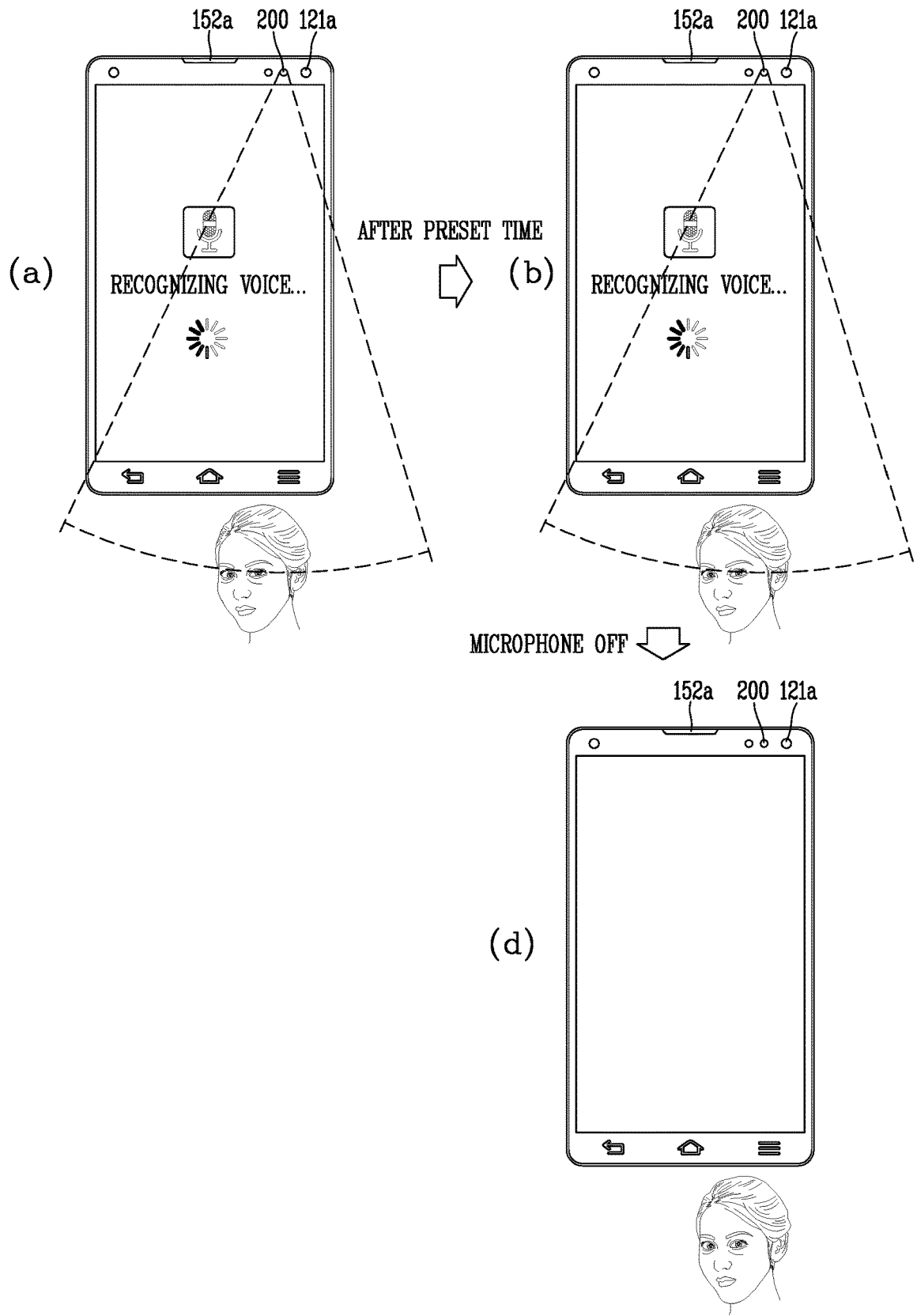

In this instance, as illustrated in (a) and (b) of FIG. 10A, when a sound of a specific loudness or more is detected again within a preset time, the controller 180 can immediately switch the microphone from the first active state to the third active state even without a recognition of a specific word. Therefore, the present invention can save time and current to be consumed to restart the voice recognition from the beginning.

As illustrated in (a) and 10 (b) of FIG. 10B, when no sound of a specific loudness or more is detected within a preset time in the first active state of the microphone, the controller 180 can terminate the voice recognition function, and switch the microphone from the first active state to the inactive state.

Figure 11A:
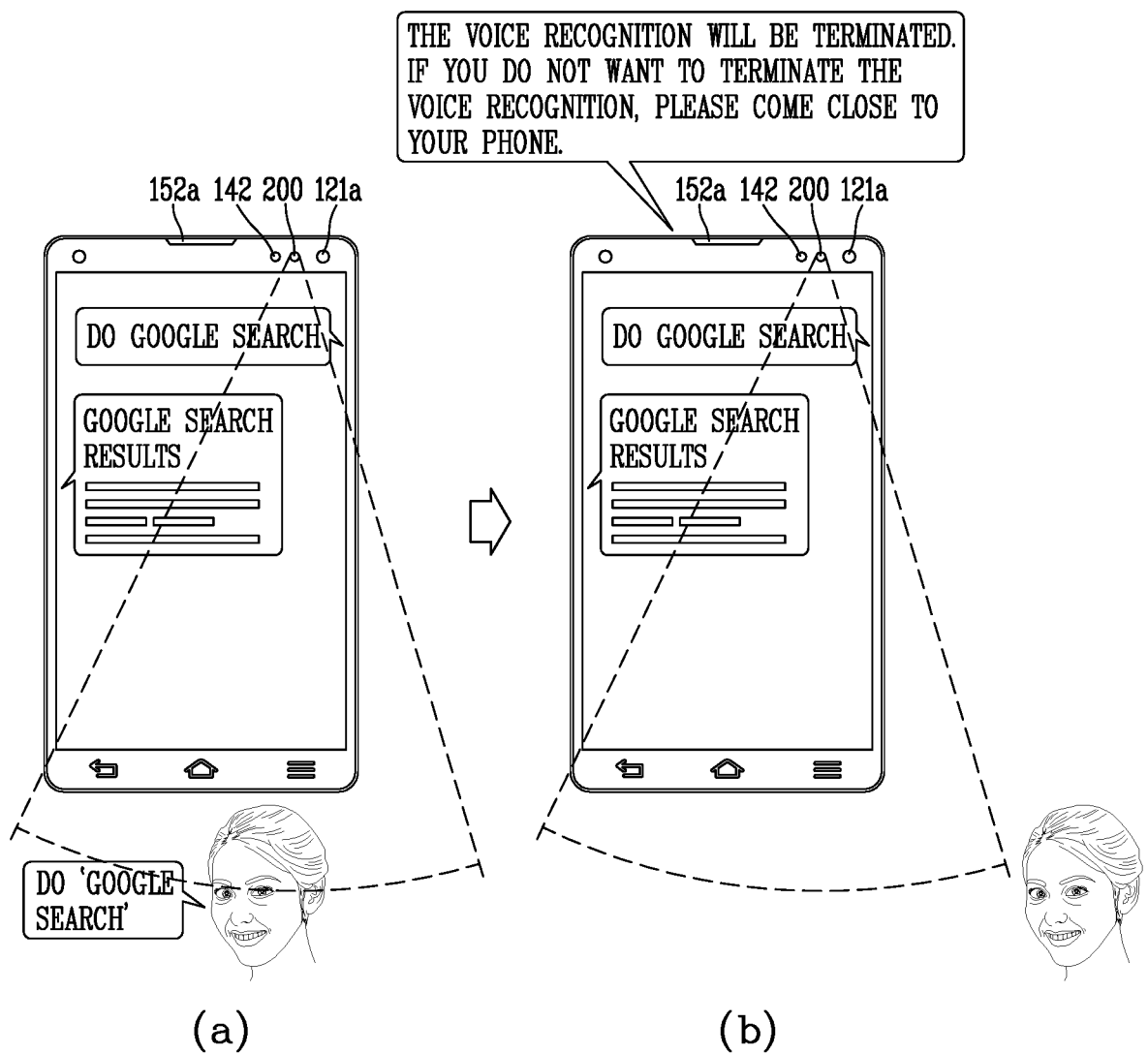
FIGS. 11A and 11B are conceptual views illustrating a manner of outputting notification information associated with a voice recognition function in a mobile terminal according to an embodiment of the present invention.
Figure 11B:
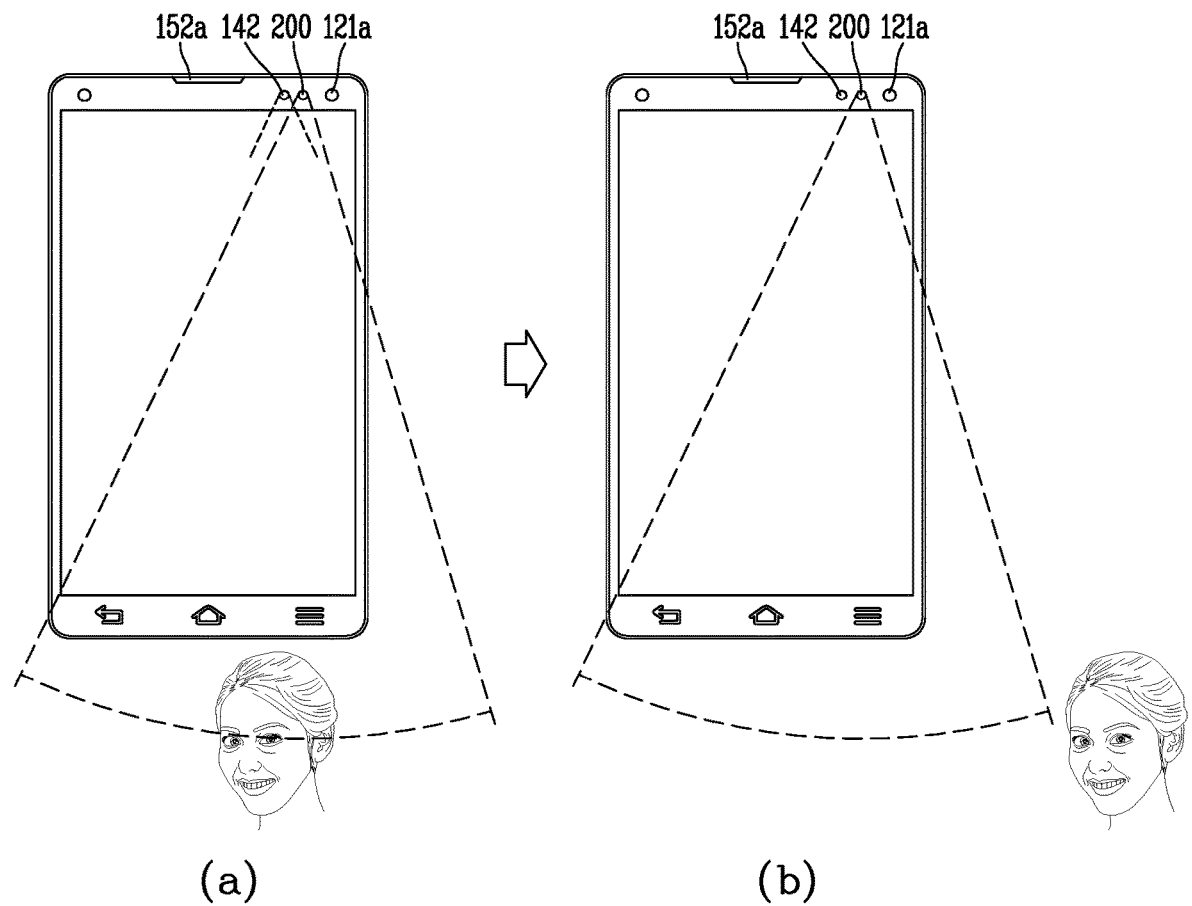

The foregoing description has been given of the embodiments related to the end time point of the microphone. Hereinafter, a manner of outputting notification information related to the voice recognition function will be described. FIGS. 11A and 11B are conceptual views illustrating a manner of outputting notification information related to the voice recognition function in the mobile terminal according to an embodiment of the present invention.

The controller 180 can output notification information when a face image is not detected during an execution of a voice recognition function. For example, as illustrated in (a) of FIG. 11A, the controller 180 can detect the face image through the low-power image sensor 200 when the face of the user is within the FOV range of the low-power image sensor 200. However, as illustrated in (b) of FIG. 11A, when the user's face is out of the FOV range of the low-power image sensor 200, the controller 180 cannot detect the face image through the low-power image sensor 200.

In this instance, the controller 180 can output notification information notifying the termination of the voice recognition function such that the user can recognize that the voice recognition function is about to be terminated before the execution of the voice recognition function is terminated. For example, as illustrated in (b) of FIG. 11A, the controller 180 can output a voice notification "The voice recognition will be terminated. If you do not want to terminate the voice recognition, please come close to your phone." In addition, the notification information can be visually output through the optical output unit or the display unit, or can be tactually output using vibration or the like.

Also, the controller 180 can output the execution state of the voice recognition function through the optical output unit. For example, as illustrated in (a) of FIG. 11B, the controller 180 can output red light when the voice recognition function is being executed. Further, as illustrated in (b) of FIG. 11B, when the voice recognition function is terminated, the controller 180 can stop the light output. The method of outputting the notification information related to the present invention has been described above.

According to the mobile terminal of the present invention as described above, the voice recognition function can be activated only if necessary, by determining whether or not to execute the voice recognition function using the low-power image sensor, thereby reducing unnecessary consumption of standby power due to the voice recognition function being always activated.

In addition, the present invention can determine the start and end time points of the voice recognition function using the low-power image sensor and start and end the voice recognition function according to the start and end time points of the voice recognition function, thereby reducing the power consumption caused due to the voice recognition function.

The present invention can be implemented as computer-readable codes in a program-recorded medium. The computer-readable medium may include all types of recording devices each storing data readable by a computer system. Examples of such computer-readable media can include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer can include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a wireless communication processor configured to provide wireless communication;
a microphone;
a front camera;
a low-power image sensor located between the microphone and the front camera and configured to detect a subject based on a black and white image sensed by the low-power image sensor, wherein a field of view range of the low-power image sensor is wider than that of the front camera; and
a controller configured to:
control the microphone to be in an inactivate state,
in response to detecting a face image included in the black and white image sensed by the low-power image sensor, switch the microphone from the inactive state to an active state,
execute a voice recognition function to receive voice information from the subject when a sound of a specific loudness or more is sensed in the active state of the microphone,
execute a specific operation based on the voice information received through the microphone after the execution of the voice recognition function,
output notification information notifying termination of the voice recognition function when the face image is out of the field of view range of the low-power image sensor and the face image is not detected by the low-power image sensor during the execution of the voice recognition function, and
terminate the voice recognition function while maintaining the active state of the microphone when the sound of the specific loudness or more is not sensed within a predetermined time.

2. The mobile terminal of claim 1, wherein the low-power image sensor is further configured to continuously detect the face image even after the execution of the voice recognition function.

3. The mobile terminal of claim 1, wherein the controller is further configured to output notification information notifying termination of the voice recognition when the voice recognition function is terminated.

4. The mobile terminal of claim 1, wherein the controller is further configured to extract a mouth shape included in the face image based on a preset algorithm, and determine whether or not to terminate the voice recognition function based on the extracted mouth shape.

5. The mobile terminal of claim 4, wherein the controller is further configured to terminate the voice recognition function when the extracted mouth shape satisfies a preset condition.

6. The mobile terminal of claim 5, wherein the controller is further configured to terminate the voice recognition function when the extracted mouth shape of a preset size or less is detected.

7. The mobile terminal of claim 5, wherein the controller is further configured to determine a mouth motion based on the extracted mouth shape, and terminate the voice recognition function when there is no mouth motion according to the determination result.

8. The mobile terminal of claim 5, wherein the controller is further configured to output notification information such that the subject recognizes the termination of the voice recognition function when the extracted mouth shape satisfies the preset condition.

9. The mobile terminal of claim 4, wherein the active state of the microphone comprises:
   a first active state of detecting a presence or absence of the sound of the specific loudness or more;
   a second active state of detecting a presence or absence of a specific word; and
   a third active state of analyzing a voice based on a voice recognition algorithm, and
   wherein the controller is further configured to switch the microphone from the third active state to the first active state when the mouth shape included in the face image corresponds to a preset condition in the third active state of the microphone.

10. The mobile terminal of claim 9, wherein the controller is further configured to deactivate the microphone when the sound of the specific loudness or more is not detected for the predetermined time in the first active state of the microphone.

11. The mobile terminal of claim 9, wherein the controller is further configured to switch the microphone from the first active state to the third active state when the sound of the specific loudness or more is detected in the first active state of the microphone.

12. The mobile terminal of claim 1, wherein the controller is further configured to execute a specific operation based on the voice information received through the microphone after the execution of the voice recognition function.

13. A method for controlling a mobile terminal, the method comprising:
   detecting, via a low-power image sensor, a subject based on a black and white image sensed by the low-power image sensor, wherein the low-power image sensor is located between a microphone and a front camera, and a field of view range of the low-power image sensor is wider than that of the front camera;
   controlling, via a controller, the microphone to be in an inactivate state;
   in response to detecting a face image included in the black and white image sensed by the low-power image sensor, switching the microphone from the inactive state to an active state;
   executing a voice recognition function to receive voice information from the subject when a sound of a specific loudness or more is sensed in the active state of the microphone;
   executing a specific operation based on the voice information received through the microphone after the execution of the voice recognition function;
   outputting notification information notifying the termination of the voice recognition function when the face image is out of the field of view range of the low-power image sensor and the face image is not detected by the low-power image sensor during the execution of the voice recognition function;
   terminating the voice recognition function while maintaining the active state of the microphone when the sound of the specific loudness or more is not sensed within a predetermined time; and
   switching the microphone from the active state to the inactive state when the face image is not detected through the low-power image sensor during the active state of the microphone.

14. The method of claim 13, further comprising determining whether or not the face image satisfies a preset condition,
   wherein the preset condition is a condition associated with a distance between the subject and the mobile terminal, or a condition associated with a mouth motion included in the face image.

15. The method of claim 13, wherein the terminating the voice recognition function comprises terminating the voice recognition function when the face image satisfies a preset condition.

16. The method of claim 13, wherein the active state of the microphone is divided into:
   a first active state of detecting presence or absence of the sound of the specific loudness or more;
   a second active state of detecting presence or absence of a specific word; and
   a third active state of analyzing a voice based on a voice recognition algorithm,
   wherein the terminating the voice recognition function comprises switching the microphone from the third active state to the first state when a mouth shape included in the face image corresponds to a preset mouth condition in the third active state of the microphone.

17. The method of claim 16, wherein the terminating the voice recognition function comprises switching the microphone to the inactive state when the sound of the specific loudness or more is not detected within the predetermined time after the microphone is switched to the first active state.

18. The method of claim 16, wherein the terminating the voice recognition function comprises switching the microphone to the third active state when the sound of the specific loudness or more is detected within the predetermined time after the microphone is switched to the first active state.

19. The method of claim 13, wherein the low-power image sensor continuously detects the face image even after the execution of the voice recognition function.

* * * * *